UNITED STATES PATENT OFFICE.

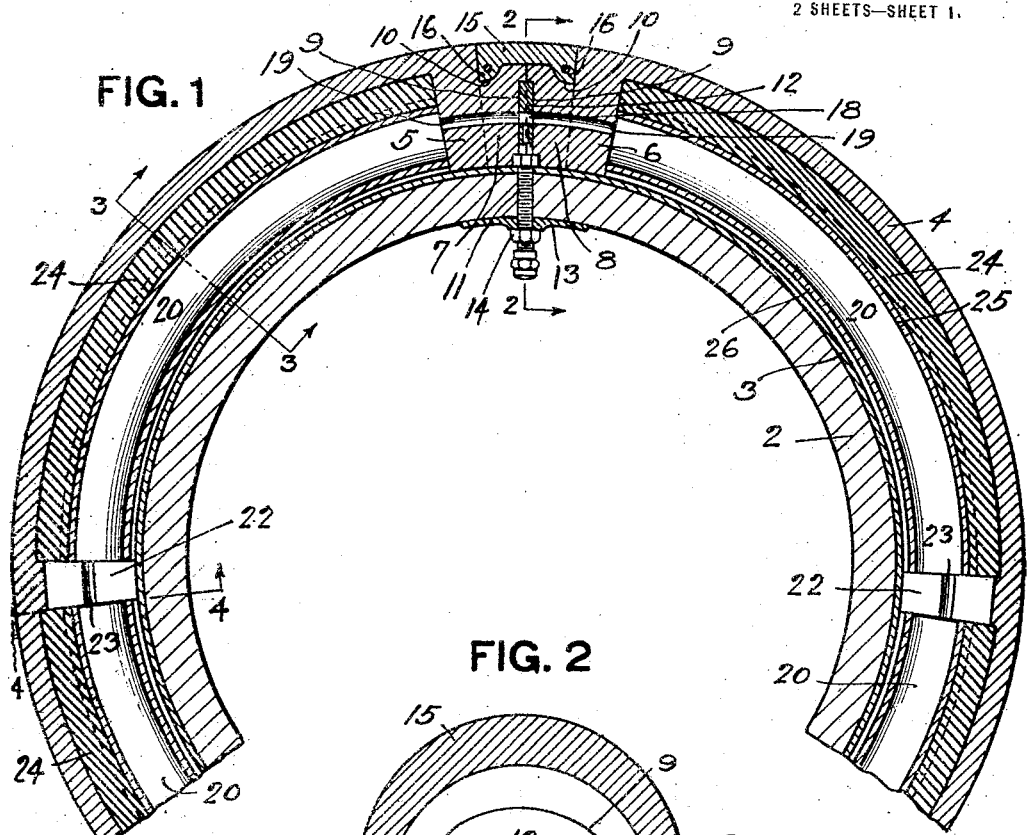

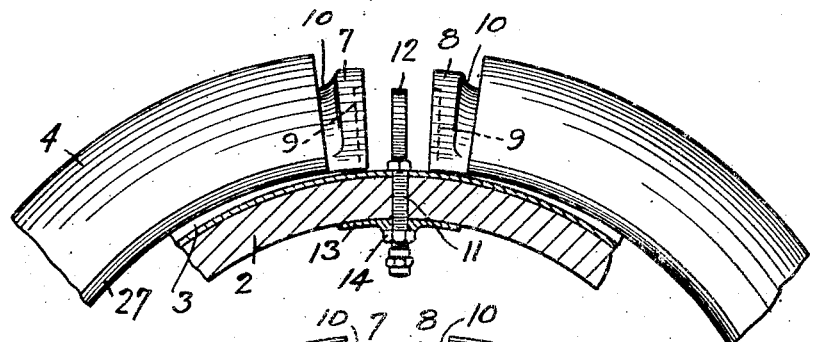
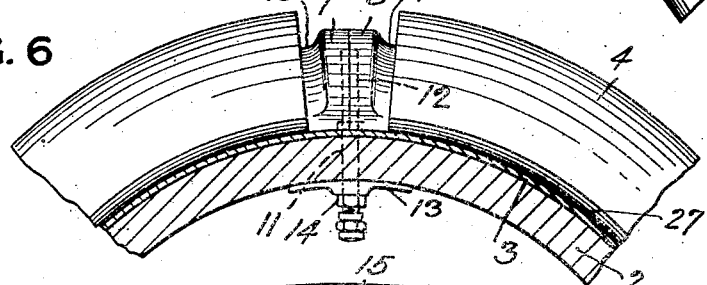
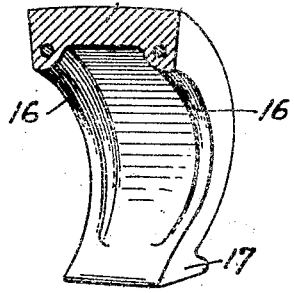
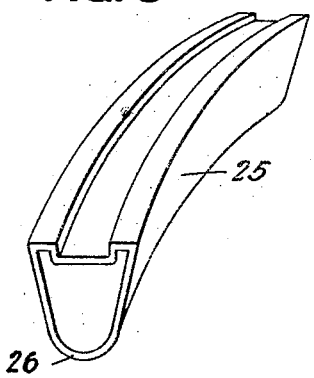
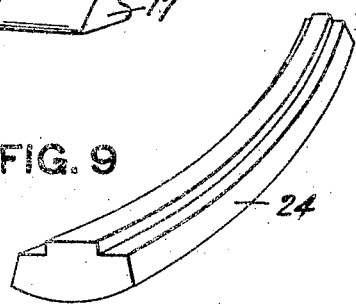

ROLLA B. BOSTWICK, OF DUQUESNE, PENNSYLVANIA.

VEHICLE-TIRE.

1,367,856.  Specification of Letters Patent.  Patented Feb. 8, 1921.

Application filed January 12, 1920. Serial No. 350,725.

*To all whom it may concern:*

Be it known that I, ROLLA B. BOSTWICK, a citizen of the United States, and resident of Duquesne, in the county of Allegheny and State of Pennsylvania, have invented a new and useful Improvement in Vehicle-Tires; and I do hereby declare the following to be a full, clear, and exact description thereof.

My invention relates to vehicle tires.

The object of my invention is to provide vehicle tires made of rubber or like resilient material.

To these ends my invention comprises the novel features hereinafter set forth and claimed.

In the accompanying drawing, Figure 1 is a sectional view of a portion of a vehicle wheel showing my invention; Fig. 2 is an enlarged cross-section on the line 2—2, Fig. 1; Fig. 3 is an enlarged cross-section on the line 3—3, Fig. 1; Fig. 4 is an enlarged cross-section on the line 4—4, Fig. 1; Fig. 5 shows the manner of making the joint connecting the ends of the tire; Fig. 6 shows the joint completed; Fig. 7 is a perspective view of a cross-section of the filler piece at the joint; Figs. 8 and 9 show suitable filler pieces for the interior of the tire.

In the drawing the numeral 2 designates a suitable felly with the ordinary clencher rim 3, although my invention may be used in connection with a demountable rim. The shoe 4 is made of rubber toughened with cotton fiber or other suitable material as in the ordinary construction of such shoes. The shoe 4 is divided instead of being formed in one piece, and its free ends are provided with the reinforcements 5 and 6 which may be vulcanized to said shoe to form an integral part thereof. The reinforcements 5 and 6 have the projecting portions 7 and 8, respectively, which project beyond the ends of the shoe and said projecting portions are provided with the recesses 9. Grooves or seats 10 are formed on the exterior of said projecting portions for the purpose more fully hereinafter set forth.

A bolt 11 passes through the felly 2 and the clencher rim 3 said bolt having the flattened head 12 which is adapted to fit in the recesses 9 in the projections 7 and 8. A washer 13 bears against the felly 2 and a lock-nut 14 secures the bolt 11 in position.

In applying the shoe to the rim 3 the shoe is brought into position, as shown in Fig. 5, whereupon the projections 7 and 8 are brought into abutting relation with the head 12 of the bolt 11 fitting in the recesses 9, as clearly shown in Fig. 6, whereupon the nut 14 is tightened and the ends of the shoe held in the position indicated in Fig. 6, the head of the nut acting to draw the ends of the shoe into contact with the rim.

To close up the depression or gap remaining between the ends proper of the shoe, I employ the filler piece 15 with the ribs 16 adapted to fit in the grooves 10 in the projections 7 and 8. The filler piece 15 is provided with the flanges 17 which are sprung into the clencher rim 3, as clearly shown in Fig. 3. In this manner the filler piece 15 is held securely in position and to all intents and purposes, a continuous riding surface for the shoe is provided.

The bolt 11 and the head 12 are preferably made hollow, said head having the opening 18 formed therein which registers with the opening 19 formed in the reinforcements 5 and 6. This provides for the venting of the air spaces 20 in the tire and permits of the escape of hot air developed in riding or due to climatic conditions.

At intervals the shoe is reinforced or supported by the rubber or like resilient blocks 22 which may be vulcanized to said shoe, said blocks dividing the shoe into the compartments 20, all, however, communicating due to the openings 23 formed in said blocks. The blocks 22 are split as at 22$^a$ to permit the opening up of the shoe for the insertion of the supports which give the necessary rigidity to the shoe, where such supports are employed, but it is of course apparent that said shoe may be supported pneumatically in the ordinary manner. In the latter case no such blocks would be required. The purpose of these blocks is to act to hold the flanges 27 of the shoes in engagement with the clencher-rim, the inner ends of said blocks fitting between the free edges of said shoe.

The compartments 20 may have any suitable form of supports therein, those illustrated consisting of the rubber or like resilient strip 24 and the hollow filler piece 25, which may be made of aluminum or other light material. The hollow filler section has the rounded nose portion 26 which bears against the inner walls of the shoe adjacent to its free edges, thereby acting to force the flanges 27 into tight engagement with the clencher rims 3. Wearing plates 28 may be interposed between said filler section and said shoe to guard against wear.

It will be apparent that any suitable form of support may be employed in the compartments 20, such for instance as the construction embodied in an application filed by me on the 9th day of June, 1919, Serial No. 302,852.

What I claim is:

1. In a vehicle tire, the combination with the rim and felly, of a divided resilient shoe, abutting members of less cross sectional area than said shoe extending beyond the ends of said shoe, recesses formed in said abutting members, a bolt having a head engaging said recesses and passing through said rim and felly, and a filler piece engaging said members and said rim.

2. In a vehicle tire, the combination with a clencher rim and felly, of a divided resilient shoe, abutting members of less cross sectional area than said shoe extending beyond the ends of said shoe, means for securing said abutting members together and to said rim and felly, and a filler piece engaging said members and having flanges engaging said rim.

3. In a vehicle tire, the combination with the rim and felly, of a divided resilient shoe, abutting members at the free ends of said shoe, recesses formed in said members and a bolt having a head engaging said recesses and passing through said rim and felly.

4. In a vehicle tire, the combination with the felly and rim, of a divided resilient shoe, abutting members at the free ends of said shoe, recesses formed in said members, and a bolt having a flattened head transversely of said shoe engaging said recesses and passing through said rim and felly.

5. In a vehicle tire, the combination with the rim and felly, of a divided resilient shoe, reinforcements at the free ends of said shoe having abutting projecting portions, means for securing said projections together and to said rim and felly, and a filler piece engaging said projections and said rim.

6. In a vehicle tire, the combination with the felly and rim, of a divided resilient shoe, reinforcements at the free ends of said shoe having projections, means for holding said projections together and to said rim and felly, said projections having grooves formed therein, and a filler piece with ribs engaging said grooves and secured to said rim.

In testimony whereof, I, the said ROLLA B. BOSTWICK, have hereunto set my hand.

ROLLA B. BOSTWICK.

Witnesses:
JOHN F. WILL,
J. R. KELLER.